Oct. 8, 1957  J. G. DELFOX  2,808,996
BOLTLESS RAIL JOINT
Filed Sept. 15, 1954  2 Sheets-Sheet 1
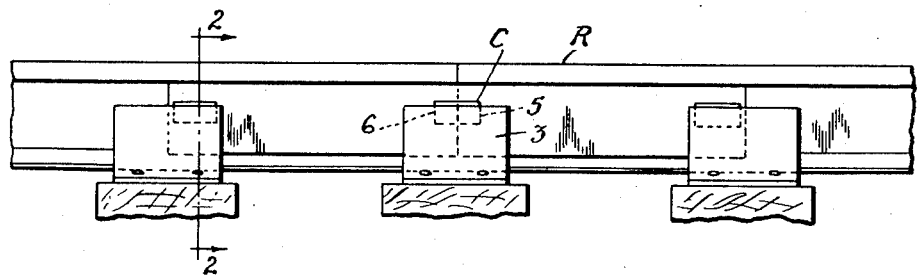
Fig. 1.
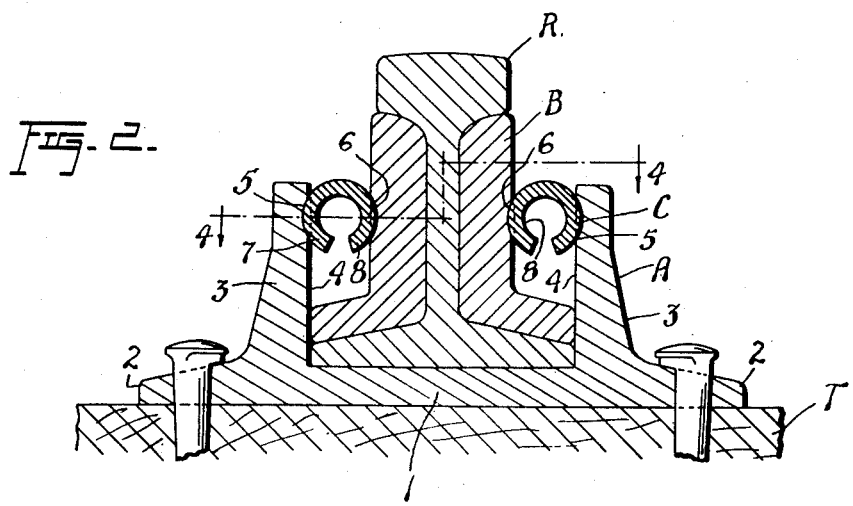
Fig. 2.
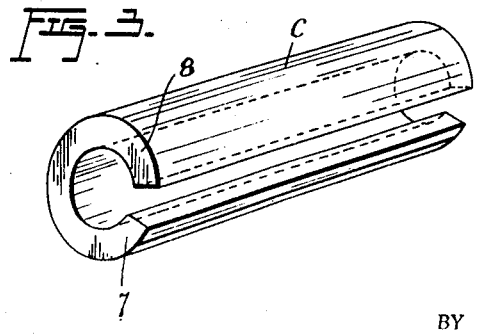
Fig. 3.
INVENTOR
James G. Delfox
BY
ATTORNEY Oct. 8, 1957  J. G. DELFOX  2,808,996
BOLTLESS RAIL JOINT
Filed Sept. 15, 1954  2 Sheets-Sheet 2
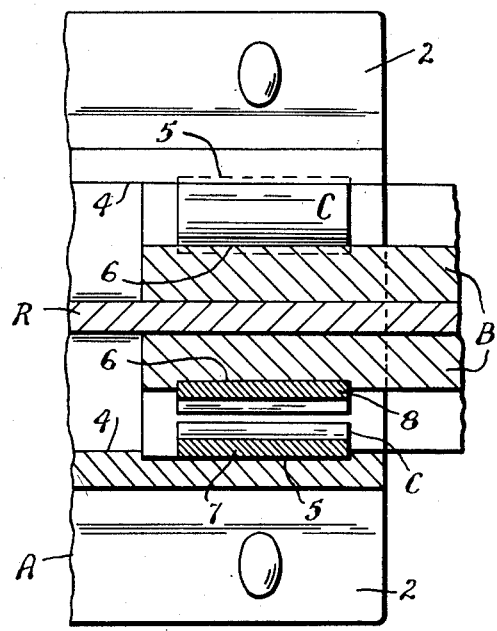
Fig. 4.
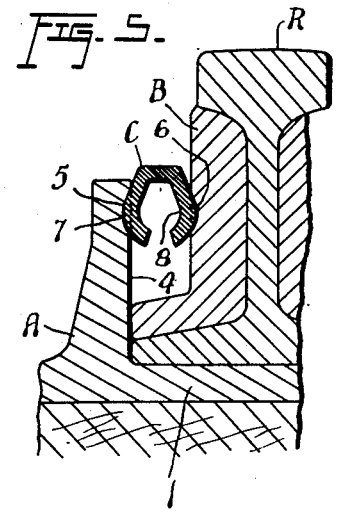
Fig. 5.
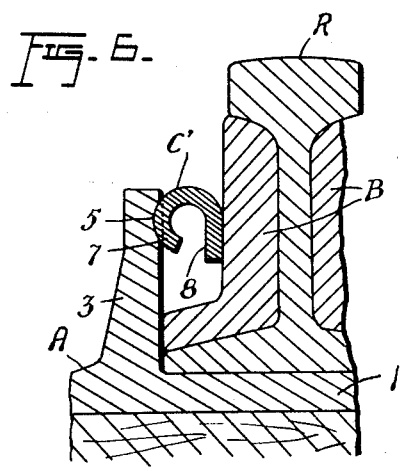
Fig. 6.
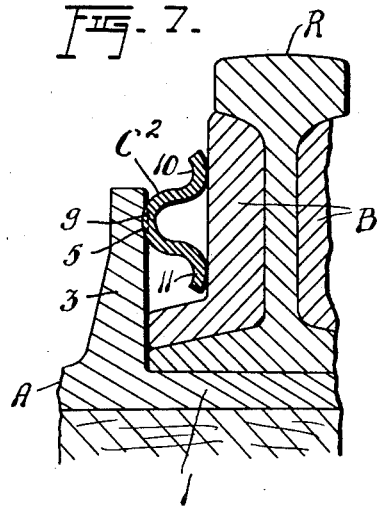
Fig. 7.
INVENTOR
James G. Delfox
BY
ATTORNEY United States Patent Office 2,808,996
Patented Oct. 8, 1957

2,808,996

BOLTLESS RAIL JOINT

James G. Delfox, Flushing, N. Y., assignor to Poor & Company, Chicago, Ill., a corporation of Delaware Application September 15, 1954, Serial No. 456,271

2 Claims. (Cl. 238—208)

This invention relates to rail joints and more particularly to a boltless joint.

While boltless rail joints have been heretofore proposed, nevertheless they have not gone into general use because they were regarded costly, in the first instance, as compared to bolted joints when maintainence on the latter type joints was low by present day standards. However, boltless joints have advantages, which in the light of current practice, makes the possibility of general use more desirable. For example, the possibilities of rail end failures due to bolt hole cracks and joint bar failures are always present in bolted joints, and often occur with consequent replacement and maintainence expense. Boltless joints would overcome these difficulties. Moreover, a boltless joint involves the important factor that it affords quick positive application or quick dismantling, and many tie plates could be eliminated.

Accordingly, the present invention has for its object the provision of a boltless joint wherein the chair or cradle and joint bars are interlocked by pressure springs or keys of transversely arched cross section which can be readily mauled into place and quickly removed by either a maul, or pried off with a bar inserted in the spring opening or lifted from below. In that connection, the springs and spring seats may be so arranged that many combinations of joint lengths may be provided to suit various installations. For example, the springs and spring seats of the chairs being of less length than the splice bar, the chairs may be used at individual tie locations to support long splice bars; or, they may be used to support short splice bars located at the center of the joint to support the rail ends to reduce rail batter; and, also, may be used at either side of the rail ends according to the particular type of joint installation. In other words, the present boltless joint being of preferably tie width can be used in multiples to suit any desired arrangement of rail support.

A preferred and practical embodiment of the invention is shown in the accompanying drawings, in which:

Fig. 1 is a side elevation illustrating one application of the present boltless joint.

Fig. 2 is a vertical cross-sectional view taken on line 2—2 of Fig. 1.

Fig. 3 is a perspective view of one of the elongated spring locking keys.

Fig. 4 is a horizontal cross-section taken on the line 4—4 of Fig. 2.

Figs. 5, 6 and 7 are partial vertical sectional views illustrating modified forms of locking keys.

Similar reference characters designate corresponding parts throughout the several figures of the drawings.

As will be observed from Fig. 2, the joint construction includes a chair or cradle designated generally as A, splice bars B fitting in the fishing spaces of the rail R, and locking elements or keys C.

The chair or cradle A comprises a base 1 having the laterally disposed spiking flanges 2. The bottom of the base 1 rests on the upper surface of the tie T and its upper inner face receives the base of the rail R. Thus, the base 1 of the chair may take the place of a tie plate.

Projecting upwardly from the base, inwardly of the flanges 2, are the upright legs or walls 3 which are of the substantial downwardly flaring cross-section shown to provide rigid non-flexing abutments for the keys C. The inner faces 4 of the walls are perpendicular to the base 1 and lie in vertical planes substantially coinciding with the outer edges of the base flanges of the rail. Said inner faces 4 are provided with key-receiving seats 5 substantially at the location of the horizontal axis of the rails R.

The splice bars B may be of any conventional type fitting in the usual manner within the fishing spaces of the rails R.

The outer faces of the splice bars B are provided with key seats 6 which mate with or are complementary to the seats 5. As will be apparent from Fig. 1, these seats are substantailly coextensive in length with the length of the keys C so as to avoid longitudinal shifting of the keys C when they are positioned in the complementary seats.

All of the keys C are of transversely arched form in the respect that they include a substantially medial hinging axis and spring wings extending oppositely therefrom.

The keys C of Figs. 1–5 are of substantially split tubular form to provide the opposite wing portions 7 and 8 which engage the seats 5 and 6 respectively in the walls 3 and splice bars B.

In Fig. 6 the key C¹ is also of split tubular formation and while wing 7 is interlocked with the recesses 5 in the wall 3 of the chair A, the wing 8 has a relative flat bearing engagement with the plain outer face of the splice bar B.

Fig. 7 illustrates a further carrying forward of the use of spring locking keys C² which include an arched crown 9 and oppositely extending wings 10 and 11. The arched crown portion 9 engages in the related seat of the wall 3 of the chair A, while the wings 10 and 11 have the outer faces of their arcuate terminal portions bearing against the flat plain outer faces of the splice bar B.

From the foregoing it will be seen that in all forms of the invention, the splice bars B are urged by the pressure spring keys C into gripping contact with the rail ends due to the fact that the springs are confined between the splice bars and the upstanding walls 3 of the chair. As previously explained, the keys C may be forced into position by a maul or the like to securely and firmly hold the joint parts together, and when it is desired to dismantle a joint as for example when relaying rail, the keys 7 may be readily removed so that they may be reused when the new rail is laid.

I claim:

1. A boltless rail joint including, joint bars, a chair having a tie bearing base and an upper rail supporting face, rigid upstanding walls at opposite sides of said face and whose inner faces lie in planes perpendicular to said face at the location of the outer edges of the base flanges of the rails disposed thereon, said inner faces each having a depressed horizontally disposed key recess provided with vertically disposed shoulders at each end, and spring keys seated in said recess and locked against horizontal and vertical movement between said recesses and the outer surfaces of the joint bars.

2. A boltless rail joint including, joint bars having their outer faces provided with horizontal recesses having vertical shoulders at the ends thereof, a chair having a tie bearing base and an upper rail supporting face, rigid upstanding side walls at opposite sides of said face and whose inner faces lie in planes perpendicular to said face at the location of the outer edges of the base flanges of the rails disposed thereon, said inner faces of the side walls each having a depressed horizontally disposed key recess therein provided with vertically disposed shoulders at each end, and spring keys seated in the recesses of the joint bars and said walls to be interlocked against longitudinal or lateral displacement and to yieldingly secure the joint bars in place.

References Cited in the file of this patent

UNITED STATES PATENTS

| | | |
|---|---|---|
| 476,241 | Bouscaren | June 7, 1892 |
| 552,082 | Baker | Dec. 24, 1895 |
| 1,563,966 | Costello | Dec. 1, 1925 |
| 1,779,802 | Cowan | Oct. 28, 1930 |
| 2,084,286 | Dobrowolny | June 15, 1937 |
| 2,204,304 | Gallagher | June 11, 1940 |
| 2,570,742 | Zeidler | Oct. 9, 1951 |